(12) United States Patent
Manchester et al.

(10) Patent No.: US 7,366,861 B2
(45) Date of Patent: Apr. 29, 2008

(54) PORTABLE MEDIA SYNCHRONIZATION MANAGER

(75) Inventors: Scott Manchester, Redmond, WA (US); Jean-Pierre Duplessis, Redmond, WA (US); Joël Lachance, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 11/074,254

(22) Filed: Mar. 7, 2005

(65) Prior Publication Data
US 2006/0200599 A1  Sep. 7, 2006

(51) Int. Cl.
*G06F 13/16* (2006.01)

(52) U.S. Cl. ...................................... 711/165; 709/217
(58) Field of Classification Search ................ 711/165; 709/217

See application file for complete search history.

(56) References Cited
U.S. PATENT DOCUMENTS

2007/0094345 A1* 4/2007 Rabbers et al. ............. 709/217

OTHER PUBLICATIONS

Belkin Corporation, "Media Reader for iPod w/ Dock Connector," Retrieved Feb. 1, 2005 from: http://catalog.belkin.com/IWCatProductPage.process?Merchant_Id=&Section_Id=201526&pcount=&Product_Id=158350.
Intellisync Corporation, "Intellisync Handheld Edition—Sync Pocket PC, Palm and Smartphones with your Desktop PC," Retrieved Jan. 12, 2005 from: http://www.intellisync.com/go/products/client-synchronization/intellisync-handheld-edition/index.cfm.
Microsoft Corporation, "Microsoft ActiveSync 3.8," Retrieved Feb. 1, 2005 from : http://www.microsoft.com/downloads/details.aspx?FamilyID=d2645c21-8a85-45a2-8d13-653beb6cdddc&DisplayLang=en.

* cited by examiner

*Primary Examiner*—Kevin L. Ellis
(74) *Attorney, Agent, or Firm*—Marshall, Gerstein & Borun LLP

(57) ABSTRACT

Embodiments of the invention provide a computer readable medium having computer executable instructions for synchronizing files between at least two portable media devices. A connection is established between one of at least two portable media devices and a portable synchronization device. A synchronization manager is initiated comprising predetermined instructions for synchronizing portable media devices. Based upon the instructions of the synchronization manager, and without requesting real-time user input, a determination is made whether to copy a file on the one of the at least two portable media devices. The file is ultimately transferred to another of the at least two portable media devices if the synchronization manager determines that the file should be transferred. A method is also provided comprising these steps. A portable media synchronization device is also provided for synchronizing at least two portable media devices.

20 Claims, 5 Drawing Sheets

PORTABLE MEDIA SYNCHRONIZATION MANAGER

FIELD OF THE INVENTION

This invention pertains to synchronization, and more particularly to synchronizing portable media devices.

BACKGROUND OF THE INVENTION

Portable media devices are generally relatively small devices having internal memory for storing files. Many of these devices are flash memory devices, while others utilize physically small hard drives. They can be extremely convenient for users because of their relatively large storage capacity given their relatively small size. Due to their generally small sizes, they are frequently used for transferring files from one location to another and often used to plug into devices such as digital cameras and portable music players. They may also be connected to a computing device, such as a personal computer or laptop computer, to copy files between the two computing device and the portable media device. Some of these devices have interface hardware that is unique to the given device. Typically such devices will plug into a slot designed to accommodate their particular shape and size. Other devices may use a more universal connection such as universal serial bus (USB) or firewire. There are many types of these devices currently available on the market, some examples of which include XD, secure digital (SD), MultiMedia cards (MMC), PCMCIA, compact flash (CF), memory sticks, portable hard drives, and USB flash drives.

Portable media devices have become extremely popular due to their increasingly larger capacities and their decreasingly smaller sizes. They are an effective mode of transportation for files such as music, picture, and work related files. Despite the abundance of these devices used every day and their portability, a user currently must rely on a computer to transfer files from one of these devices to another. Therefore, the extent of the portability of these devices is limited by the fact that file transfer between devices cannot take place on the go. Furthermore, user interaction is required to select files to transfer from one device to another. This can be time consuming and tedious when the user only wants a certain type of file transferred and there are a large number of files and/or directories to traverse through because the user must go through each folder and select each file one by one.

There are currently portable media device readers that allow a user to copy files from a portable media device to a more sophisticated device, such as a portable digital music player. Devices such as these, however, only provide one-way copying of files from the portable media device to the more sophisticated device. These devices do not permit the copying of files in the reverse direction and do not permit files to be copied between two or more portable media devices. In addition, current devices only perform strict copying from the portable media device to the more sophisticated device. If a user does not want all of the files transferred, then they are forced to later delete any files that were transferred that they did not want on the more sophisticated device.

BRIEF SUMMARY OF THE INVENTION

Embodiments of the invention provide a computer readable medium having computer executable instructions for synchronizing files between at least two portable media devices. A connection is established between one of the at least two portable media devices and a portable synchronization device. A synchronization manager is initiated comprising predetermined instructions for synchronizing portable media devices. Based upon the instructions of the synchronization manager, and without requesting real-time user input, a determination is made whether to copy a file on the one of the at least two portable media devices. The file is ultimately transferred to another of the at least two portable media devices if the synchronization manager determines that the file should be transferred. A method is also provided comprising these steps.

Embodiments of the invention further provide a portable media synchronization device. The portable media synchronization device comprises a hardware interface, internal memory, and a synchronization manager. The hardware interface is for connecting at least one portable media device to the portable media synchronization device. The internal memory stores the synchronization manager. The synchronization manager comprises predetermined instructions for copying files from a first portable media device to a second portable media device. The synchronization manager is initiated after a connection is established via the hardware interface. The synchronization manager copies a file from the first portable media device to the second portable media device based on the predetermined instructions.

Embodiments of the invention further provide having two portable media devices connected to a portable media synchronization device before synchronizing the portable media devices.

Embodiments of the invention further provide the capability to select certain file types to be copied from one portable media device to another.

Embodiments of the invention further provide the capability to choose a preferred order of copying certain file types.

Embodiments of the invention further provide having a synchronization manager on a portable media device.

Embodiments of the invention further provide traversing a file allocation table to find files to copy.

Embodiments of the further provide renaming a file when the filename is identical to the filename of another file.

Embodiments of the invention further provide that the synchronization logic may be adjusted by a user prior to synchronization.

These and other advantages of the invention, as well as additional inventive features, will be apparent upon reading the following detailed description and upon reference to the drawings.

DETAILED DESCRIPTION OF THE INVENTION

Figure 1:
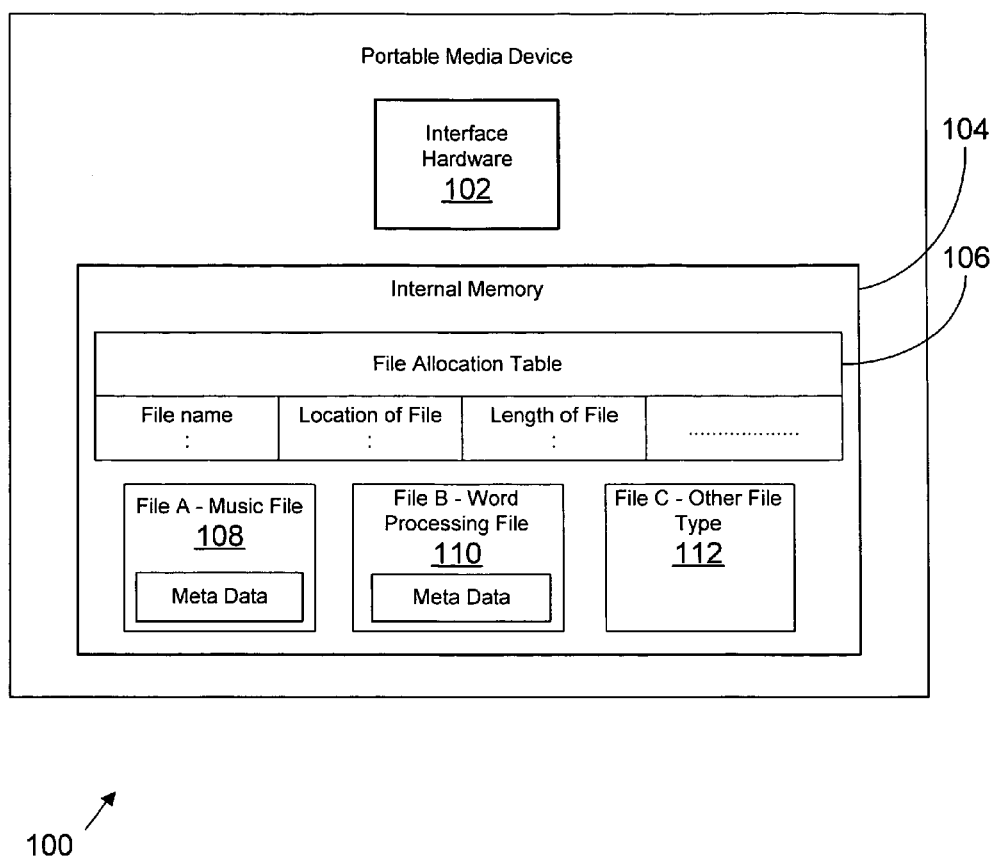
FIG. 1 is a diagram illustrating a portable media device.

Portable media devices 100 are generally relatively small devices containing internal memory 104 and interface hardware 102 used to connect the portable media device to a computer 100 or the like. The internal memory 104 may be used to store one or more files 108, 110, 112, and may include a directory structure 106. These devices 100 are typically used for transporting files from one location to another. They have an advantage over many traditional storage mediums in that they are able to hold relatively large amounts of data, they are typically small and lightweight, many are durable because they often contain no moving parts, and they are rewritable. There are many varieties of these portable media devices 100 currently on the market, many of which have differing hardware for connecting to a computer, portable music player, digital camera, etc. Some examples of these portable media devices include XD, secure digital (SD), MultiMedia cards (MMC), PCMCIA, compact flash (CF), memory sticks, portable hard drives, and universal serial bus (USB) flash drives. One of ordinary skill in the art would appreciate that the invention may be used to synchronize any suitable portable media device known in the art.

Turning to FIG. 1, there is shown a simplified diagram of a portable media device 100. Portable media devices comprise a structure for managing the contents of the portable media device. For example, a portable media device may comprise a file allocation table 106 that acts as a table of contents for the files and directories stored within the memory of the portable media device 100. By way of example and not limitation, a sample file allocation table 106 is shown in FIG. 1. The file allocation table 106 may be FAT12, FAT16, FAT32, NTFS, or other suitable file system structure. The file allocation table 106 contains information about files 108, 110, 112 such as the name of the file, where the file is located, the length of the file, etc. Embodiments of the invention are capable of transferring files 108, 110, 112 from portable media devices 100 having different types of file allocation tables 106.

Multiple files 108, 110, 112 may be stored in the internal memory 104 of a portable media device 100. Some of these files 108, 110, 112 stored on the portable media device 100, such as music files 108 or word processing file 110 may contain metadata. The metadata contains information about the file 108, 110. For example, metadata in a music file 108 may contain artist name, album name, length of song, bit rate, and other information about the file. Metadata in a word processing file 110 may contain information such as who has edited the file, how many times the file has been revised, etc.

Figure 2:
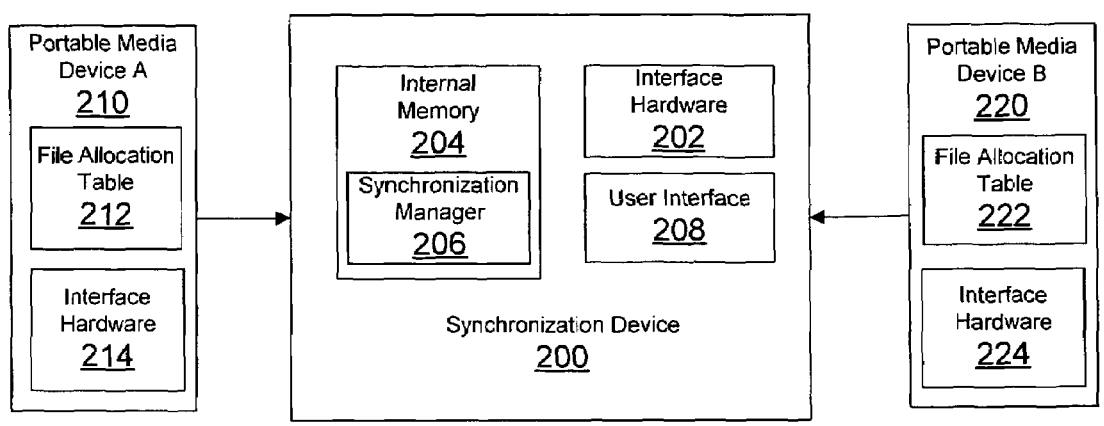
FIG. 2 is a diagram illustrating a portable media synchronization device having a synchronization manager in accordance with an embodiment of the invention.

FIG. 2 shows two portable media devices 100, described as portable media device A 210 and portable media device B 220, and a synchronization device 200 for synchronizing files between a plurality of portable media devices 100. Portable media devices A 210 and B 220 comprise file allocation tables 212, 222, respectively, and interface hardware 214, 224, respectively. The synchronization device 200 provides a way for a user to easily transfer files between portable media devices 100. The synchronization device 200 may be a relatively small portable synchronization device that can be easily transported allowing synchronization to take place almost anywhere without the need for a computer to act as an intermediary. In certain embodiments, the synchronization device 200 would be approximately the size of a portable media device 100. Additionally, the synchronization device 200 may be relatively simple to use and inexpensive to manufacture.

The synchronization device 200 comprises interface hardware 202 that permits one or more portable media devices 100 to connect to the synchronization device 200. In certain embodiments, the synchronization device 200 further comprises internal memory 204. In some embodiments, the internal memory 204 is read-only, and in other embodiments, the internal memory 204 may be rewritable. The internal memory 204 may be relatively small in capacity to save cost and enhance portability by minimizing the size of the synchronization device 200. In other alternate embodiments, the synchronization device 200 may instead have a relatively large amount of internal memory 204 to store files during synchronization, for example. The internal memory 204 comprises a synchronization manager 206 stored thereon. The synchronization manager 206 comprises computer-executable instructions, such as one or more program modules. Generally, program modules include routines, programs, objects, components, data structures, etc. that perform particular tasks or implement particular abstract data types. Typically the functionality of the program modules may be combined or distributed as desired in various embodiments.

The synchronization manager 206 can apply synchronization logic to determine which files are to be copied from one portable media device 100 to another. In some embodiments, the synchronization manager 206 transfers files automatically without user interaction. The synchronization device 200 may be able to automatically detect when two portable media devices 100 have been connected to the synchronization device 200 and initiate the synchronization manager 206 without user interaction.

In other embodiments, the synchronization manager 206 may be adapted to prompt the user to make a selection during transfer. The synchronization device 200 may have one or more user interfaces 208 such as buttons or a touch screen allowing a user to make selections and/or initiate synchronization. For example, once two portable media devices 100 have been connected to the synchronization device 200, a user may press a button on the synchronization device 200 to initiate the synchronization process. In addition, the portable media synchronization device 200 may comprise a user interface 208 in the form of a light emitting diode (LED), liquid crystal display (LCD), audio emitting hardware, or other suitable indicator that may be used, for example, to inform a user of the progress of the synchronization, alert the user if an error has occurred, and/or indicate that the synchronization has been completed. For example, the synchronization device 200 may have a progress bar shown on an LCD screen or a series of LED's which light up consecutively to show the progress of the synchronization process. Similarly, the synchronization device 200 may have an internal speaker that emits a noise once synchronization is complete.

The interface hardware 202 on the synchronization device 200 may be designed to accommodate a single specific type of portable media device 100 or other specific interface type (such as USB or firewire). Alternately, the interface hardware 202 may comprise a plurality of interfaces for receiving different types of portable media devices 100 having different types of interfaces. Certain portable media devices 100 may slide into a slot on the synchronization device, while others may have a more standardized interface connection such as USB or firewire (the portable media device connecting into such interfaces or via a cable). In further embodiments, the synchronization device 200 may have an interface for connecting an external portable media device reader to expand the number of portable media device types that may be connected to the synchronization device 200.

Figure 3:
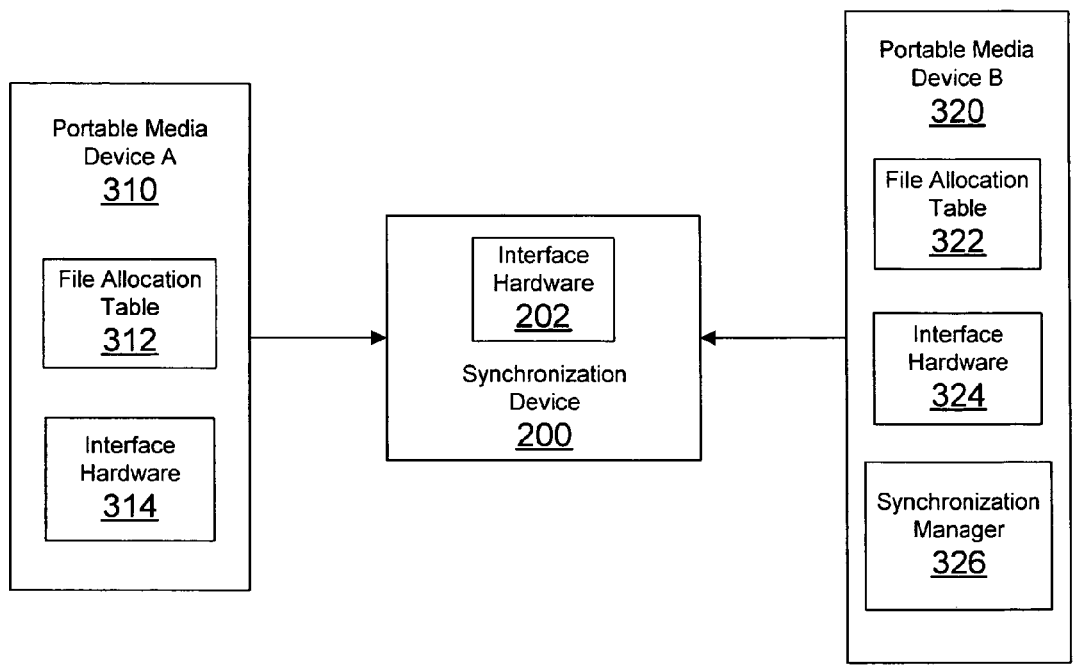
FIG. 3 is a diagram illustrating an embodiment wherein the synchronization manager is stored on a portable media device in accordance with an embodiment of the invention.

Alternately, as shown in FIG. 3, in some embodiments the synchronization device 200 may not contain any internal memory 204, the synchronization manager 326 instead being located on one or both of the portable media devices 100. In these embodiments, the portable media synchronization device 200 merely acts as a hardware interface between portable media devices 100. In its simplest form, when the synchronization manager 326 is stored on a portable media device 100 instead of within the synchronization device 200, the synchronization device 200 may merely be a cable for connecting portable media devices 100. More sophisticated embodiments of the synchronization device 200 without the synchronization manager 206 stored within may include, for example, a user interface 208 or a plurality of different types of interface hardware 202 to accommodate many different types of portable media devices, as mentioned above. Although the synchronization manager 326 is depicted as residing on portable media device B 320, the synchronization manager 326 may alternately reside on both devices 310, 320. When the synchronization manager 326 resides on both devices 310, 320, the synchronization manager 326 may have a default way to decide which synchronization manager 326 will be used. This may be determined by which version of the synchronization manager 326 has most recently been updated, the synchronization device 200 may have a user interface to select which device's synchronization manager 326 will dominate, or other suitable methods may be used to determine which synchronization manager 326 will be used.

Figure 4:
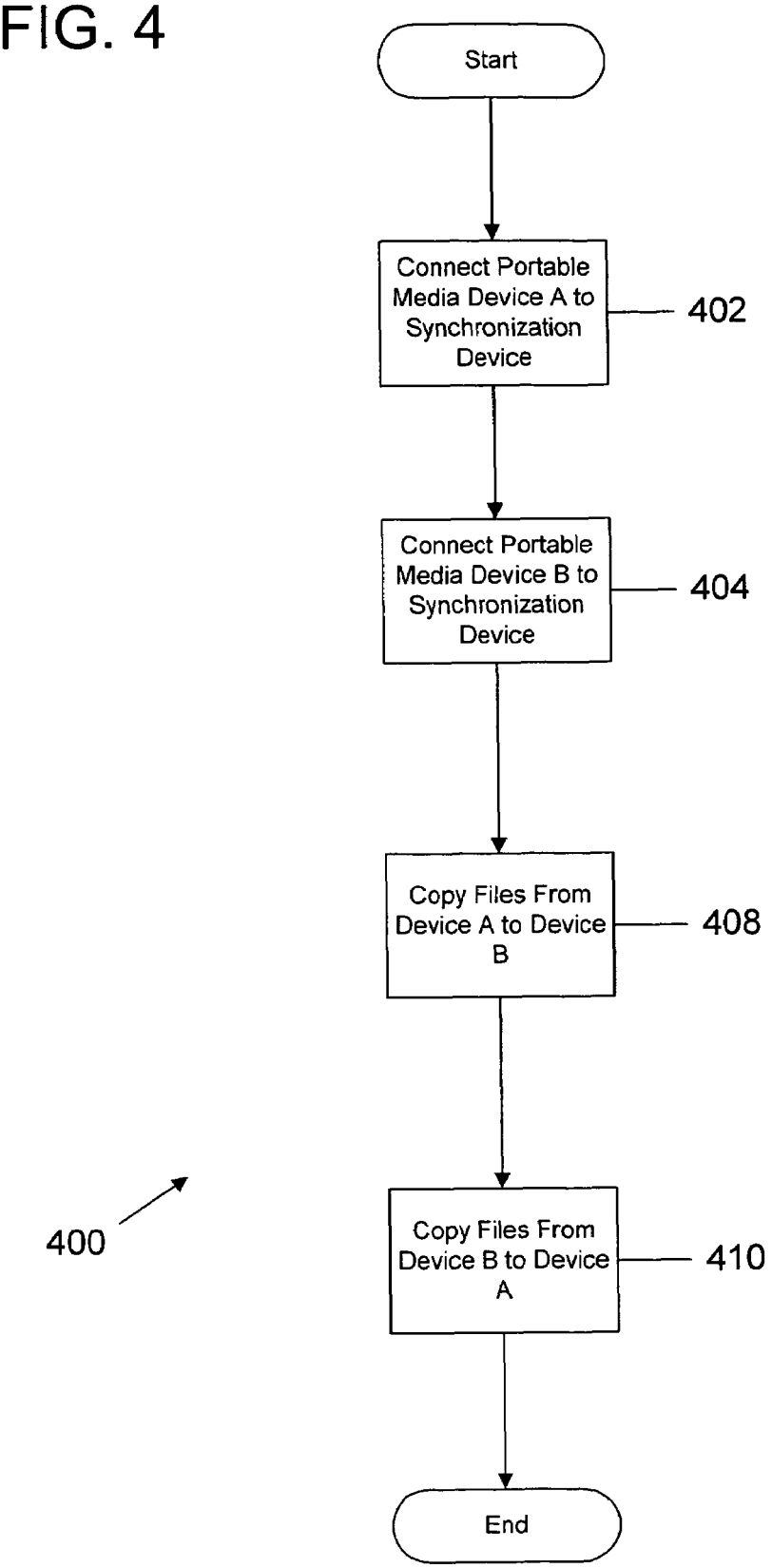
FIG. 4 is a flow diagram for a media synchronization manager in accordance with an embodiment of the invention.

As shown in the flow diagram 400 of FIG. 4, embodiments of the invention permit the swapping of files between multiple portable media devices. A user begins by connecting a portable media device A 210 into the synchronization device 200 in step 402. A second media device, media device B 220, is then connected to the synchronization device B 220 in step 404. The synchronization manager 206, 326 then begins to copy files from device A 210, 310 onto device B, 220, 320 in step 408. Finally, the synchronization manager 206, 326 copies files from device B 220, 320 to device A 210, 310 in step 410. A user may remove the portable media devices once the synchronization is complete.

Many times issues may arise that complicate the transfer of files from one portable media device 100 to another. For example, how does the synchronization manager 206, 326 react when there are two files with the same filename on different portable media devices 100? What happens when one or both portable media devices 100 have reached full capacity before all of the files have been transferred? What if a user does not want all of the files on one device or another to be transferred? To address these issues and others, the synchronization manager 206, 326 contains instructions that apply a desired logic to determine what happens when certain events occur.

Figure 5:
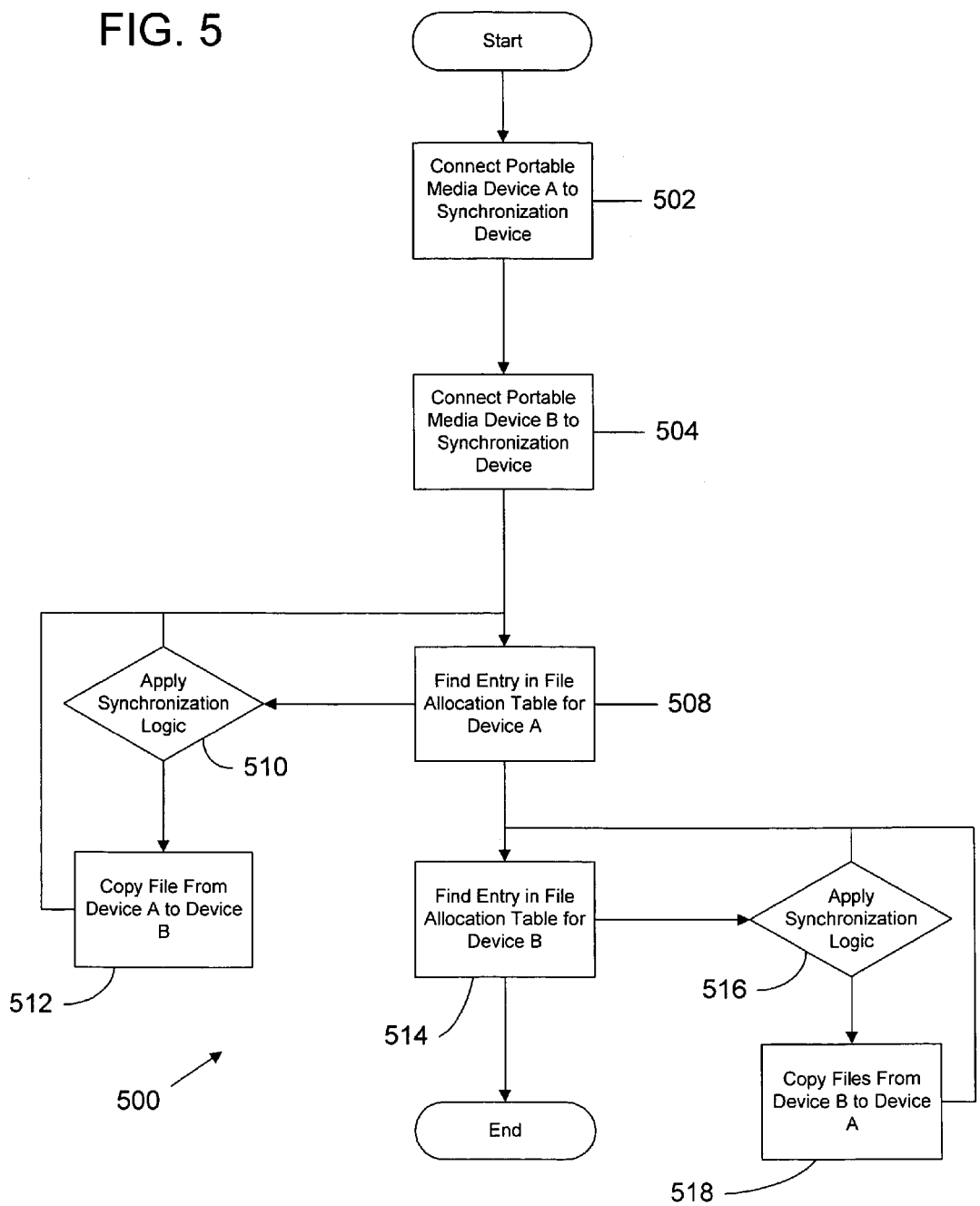
FIG. 5 is another flow diagram for a media synchronization manager in accordance with an embodiment of the invention.

Turning to FIG. 5, a flow diagram 500 shows the application of synchronization logic when transferring files. A first portable media device A 210 is connected to the synchronization device 200 in step 502, and a second portable media device B 220 is connected to the synchronization device 200 in step 504. The file allocation table 212, 312 on portable media device A 210, 310 is traversed to find files on the portable media device 210, 310 and determine, by applying the synchronization logic, whether to copy them to portable media device B 220, 320. Once the file allocation table 212, 312 for device A 210, 310 has been traversed, the file allocation table 222, 322 for portable media device B 220, 320 is traversed to determine, once again by applying the synchronization logic, whether to copy the files on portable media device B 220, 320 to portable media device A 210, 310.

More specifically, once the portable media devices are connected to the synchronization device 200 or directly to one another, the synchronization manager 206, 326 finds the first entry in the file allocation table 212, 312 for the device A 210, 310 in step 508. The synchronization manager 206, 326 applies the synchronization logic in step 510 as will be described in further detail below. If the synchronization logic as applied to the file determines that the file should not be transferred, then the next entry in the file allocation table 212, 312 is found in step 508. Alternately, if the synchronization logic of the synchronization manager 206, 326 determines that the file should be transferred, as is described in more detail below, then the file is copied from device A 210, 310 to device B 220, 320 in step 512. The next file in the file allocation table 212, 312 is then found in step 508. Once the entire file allocation table 212, 312 for portable media device A 210, 310 has been traversed via step 508, the synchronization manager 206, 326 then begins traversing the file allocation table 222, 322 for portable device B 220, 320, as shown in step 514. Once a file is found in step 508, the synchronization manager 206, 326 applies the synchronization logic in step 516 to determine whether the file should be copied to portable media device A 210, 310. If the synchronization manager 206, 326 determines not to transfer the file, then the next entry in the file allocation table 222, 322 for portable media device B 220, 320 is found in step 514. If the synchronization manager 206, 326 determines that the file should be transferred, then in step 518, the file is copied from portable media device B 220, 320 to portable media device A 210, 310. The next file in the file allocation table 222, 322 for portable media device B 220, 320 is then found in step 514.

Once the file allocation table 222, 322 for portable media device B 210, 310 has been traversed, then the synchronization is complete and the user may remove the portable media devices from the synchronization device 200 or each other. The synchronization device 200 may indicate to the user that the synchronization process is complete via a user interface, series of LED's, or audible component as described above. The synchronization manager may keep track of the files copied from portable media device A 210, 310 to portable media device B 220, 320 such that when traversing the file allocation table 222, 322 for portable media device B 220, 320, the files that were copied from device A 210, 310 to device B 220, 320 in step 512 are bypassed to save time and avoid copying files back to portable media device A 210, 310 that originated on portable media device A 210, 310.

In some embodiments, the synchronization device 200 may have only one hardware interface 202 for connecting a particular type of portable media device 100 or the user may not have access to all of the devices that the user wants to synchronize at the same time. In these embodiments, the synchronization device 200 can comprise a sufficient amount of internal memory 204 to allow the synchronization manager 206 to serve as temporary storage until the second portable media device is plugged into the synchronization device 200. Instead of having a sufficiently large amount of internal memory 204, the device may alternately be combined with a portable media device 100 that serves the same purpose of providing memory for temporarily storing data.

The contents of portable media device A 210 are automatically copied to the synchronization device 200 or the portable media device 100 used for temporary storage once portable media device A 210 is connected to the synchronization device 200. Portable media device A 210 is removed and portable media device B 220 is then connected once portable media device B 220 is available to the user. The contents of portable media device A 210 are copied to portable media device B 220 as described above. If the user desires, the contents of portable media device B 220 may then be copied to the synchronization device 200 or the portable media device 100 used for temporary storage. Subsequently, portable media device B 220 is disconnected and portable media device A 210 can be later reconnected to copy the contents of portable media device B 220 to portable media device A 210 as described above. Portable media device A 210 can be disconnected again and the synchronization device 200 may remove (e.g. by pressing a user interface 208 in the form of a button on the synchronization device 200, etc.) the stored contents in the internal memory 204 or the external portable media device 100 used as temporary storage.

The synchronization manager 206, 326 applies synchronization logic to determine whether or not to copy a given file from one portable media device to another. The synchronization logic may be pre-configured to have the synchronization manager 206, 326 make certain decisions and/or a user may be able to adjust the synchronization logic of the synchronization manager 206, 326. This may be accomplished by establishing particular rules or policies that a user, supplier, and/or manufacturer may select to control how the synchronization manager 206, 326 operates. By way of example and not limitation, a user may decide that they only want to transfer certain file types between devices and/or the manufacturer/supplier may decide to preprogram the synchronization manager 206, 326 for copying only certain file types. More specifically, the synchronization manager 206, 326 may apply synchronization logic to only copy pictures from one portable media device 100 to another, but not other files on the portable media devices 100. The synchronization logic will determine whether the file is a picture file based upon the file extension. If the file has an extension that is associated with a picture file, such as .jpg, then the synchronization manager will copy the file. Otherwise, the synchronization manager will skip past this file and move onto the next file in the file allocation table. As another example, the synchronization manager may be configured to specifically exclude certain file types, such as *.mp3 or other audio files to avoid copying files that may contain copyrighted material. One of ordinary skill in the art would appreciate that the synchronization manager 206, 326 may be programmed to copy or exclude from copying a variety of file types depending on user and/or manufacturer/supplier preference.

In some embodiments, the user may be presented with a graphical user interface (GUI) on an LCD screen on a synchronization device 200, which would allow the user to select the types of files that the user would like to copy or exclude. The user interface may simply be a display that allows a user to navigate amongst a series of options that the user may select or deselect. For example, referring again to the ability of a user to select particular file types to copy or not copy, the user interface may provide a list of file types that the user may select or deselect. Alternately, or in addition, the user interface may group certain file types together and allow a user to select an entire group of file types to simplify the process for the user. More specifically, all music file types may be grouped in a single category (i.e., .mp3, .wav, etc.), all picture files may be grouped within a single category (i.e., .bmp, .jpg, etc.), and so forth such that a user may select a particular category of file types rather than having to select file types one by one.

In certain embodiments, a user may make adjustments to the synchronization logic of the synchronization manager 206, 326 on a computer, and then connect the computer to a portable media synchronization device 200 to update the synchronization manager 206, 326 on the portable media synchronization device 200. For example, the user may be presented with a user interface on a computer that allows the user to adjust the synchronization logic. The user may be able to select specific file types or groups of file types such as described above. The portable media synchronization device 200 or the portable media device 100 (in embodiments where the portable media device 100 comprises a synchronization manager 326) may then be connected to the computer to update the synchronization manager 206, 326 on the synchronization device 200 or portable media device 100.

Other than selecting specific file types to copy between portable media devices 100, the synchronization logic may be used to solve undesirable situations that may arise when transferring files. For example, when files with the same file name appear on both portable media devices 100, the synchronization logic can be used to decide how the synchronization manager 206, 326 will react. Depending on how the synchronization manager 206, 326 is programmed, the synchronization manager 206, 326 may merely rename the file that it is copying such that there is no longer a conflict. For example, if a file exists on both portable media devices 100 with the same filename, such as text.txt, the synchronization manager 206, 326 may rename the file being copied to a different file name, such as text1.txt or other suitable filename, to distinguish the file being copied from the file that already exists on the portable media device 100.

Alternately, the synchronization manager 206, 326 may do a comparison between the files. If the files are truly identical (in that both files are the same size, have the exact same content, etc.), then the synchronization manager 206, 326 may decide not to copy the particular file to the other portable media device 100. In contrast, the synchronization logic may determine that the file is different in some way from the file on the other portable media device 100 and will copy the file with a different filename to the other portable media device 100. The synchronization manager 206, 326 may compare the files based on certain criteria. By way of example and not limitation, some examples of file comparison criteria include the size of the file, creation date of file, and date the file was last modified. Additionally, for certain file types, the criteria may be based on characteristics specific to that particular file type. If the file is a music file, the synchronization manager 206, 326 may look at the length of the song, the artist, the album the song came from, the bit rate, etc. If the file is an image, the synchronization manager 206, 326 may look at the size of the image, the image resolution, etc. Some of the information used to compare files may be available from the file allocation table 106 and some of this information may be found in the metadata of the file. In certain embodiments, the user may be prompted when two filenames are identical giving the user the option to copy or not copy them and/or allow the user to rename the file as desired.

Another issue that may arise is when the capacity of one or both devices is reached. Under these circumstances, the synchronization manager 206, 326 may be programmed to not copy any files, or may be set up to copy as many files as possible until capacity is reached. Once again the synchronization logic may be predetermined by the provider of the synchronization logic or the user may be able to select how the synchronization manager 206, 326 will react. When the user is able to select how the synchronization manager 206, 326 will react when capacity is not sufficient to copy all files, the user may have the option of telling the synchronization manager either before synchronization or during synchronization. For example, the user may use a computer or a user interface 208 on synchronization device 200 as described above to instruct the synchronization manager to copy certain files types before others. More specifically, a user may want to make sure that as many picture files as possible are copied before reaching capacity. Therefore, the synchronization manager may traverse through all of the picture files first in the file allocation table 106 before moving on to other file types (assuming there is still room after copying all of the picture files). The user may also select a desired order of copying files. By way of example and not limitation, a user may instruct the synchronization manager 206, 326 to copy picture files first, then music files, then word processor documents, then spreadsheets, and then everything else.

When capacity is nearly reached on a portable media device 100 when copying files to the portable media device 100, the synchronization manager 206, 326 may have a set of rules or policies for deleting certain files on the portable media device 100 to make room for the files being copied. Files may be chosen for deletion based on any suitable criteria, such as file extension type, size, creation date, least frequently accessed, etc. By way of example and not limitation, the synchronization manager 206, 326 may be programmed to delete the oldest files on the portable media device 100 first. As capacity is nearly reached on a portable media device 100, the synchronization manager 206, 326 can determine, based on the file allocation table, which file has the earliest creation date. This file can then be deleted to make room for copying files onto the portable media device 100. If enough room is still not available after deleting this file, then the process can be repeated. As another example, the synchronization manager 206, 326 may delete the largest file first to attempt to minimize the number of files that need to be deleted to make space on the portable media device 100 during the synchronization. In certain embodiments having a synchronization device 200 with a user interface 208, the user may be prompted via the user interface 208 to approve any deletion before the deletion occurs and/or the user may be able to select a file to delete on his/her own should additional space be necessary.

In certain embodiments, the synchronization manager 206, 326 may be preprogrammed onto the synchronization device 200 to apply rules or policies that handle situations as described above without any need for user interaction other than plugging in the portable media devices. This adds to the simplicity of the synchronization device 200, which allows users to operate the device immediately out of the box. This may be accomplished by the manufacturer/supplier preloading the synchronization manager 206, 326 into the internal memory 204 of the synchronization device 200 or portable media device 100. Alternately, in some embodiments, users may be able to select preferences and customize the synchronization manager 206, 326 to the user's needs.

The synchronization manager 206, 326 may also be adapted to respect lock/read-only settings of portable media devices 100. For example, a device such as a secure digital (SD) portable media device has a locking switch on the memory device that allows a user to selectively make the device read-only. The synchronization manager 206, 326 may be able to recognize when the device has been made read-only. When one device is read-only and the other device is not read-only, the synchronization manager 206, 326 may do a one-directional transfer from the read-only device to the non-read-only device. If both devices are read-only, the synchronization manager 206, 326 can abort and need not perform a file transfer in either direction.

Certain embodiments permit the synchronization manager 206, 326 to designate a particular portable media device as a master media device and other media devices as guest devices. Different rules for copying files may be applied to these different portable media devices 100 based upon their classification as master or guest. By way of example and not limitation, the synchronization manager 206, 326 may be programmed to automatically designate the first portable media device 100 plugged into a synchronization device 200 as a master and the second portable media device 100 as a guest. Alternately, the user may be able to adjust the synchronization manager 206, 326 to recognize certain portable media devices (e.g., the portable media devices that the user owns) as masters and all portable media devices that are not recognized are treated as guests. The synchronization manager 206, 326 may have specific rules that treat the master differently from the guest, such as the synchronization manager 206, 326 may treat a master as read-only and a guest as read-write. Thus, files are copied from the master to the guest, but not from the guest to the master. Other suitable rules or policies may be established to treat master portable media devices differently than guest portable media devices.

In embodiments where the synchronization device 200 is a relatively small portable device, the device may be battery powered to enhance the portability of the synchronization device 200. Certain types of memory require relatively low power draw, which is typically correlated with size of the memory. Therefore, the synchronization device 200 may be designed to minimize internal memory 204 in order to maximize battery life of the device 200. One of ordinary skill in the art, however, would appreciated the synchronization device 200 may be supplied power by any suitable power source.

The following examples further illustrate the invention but, of course, should not be construed as in any way limiting its scope. In operation, a user may be carrying a portable media device 100 containing digital images of his family. The user may decide to bring this media device to a social or family gathering where friends or family member have brought their own portable media devices containing their own images. Users can easily exchange images from one portable media device 100 to another. The user merely needs to connect each portable media device 100 to the synchronization device 200 and the device will automatically transfer files from one portable media device 100 to the other and vice versa. The user need only have the relatively small portable synchronization device 200 with them.

As another example, a user may be taking pictures with friends using his/her digital camera having a portable media device 100 attached thereto for storing the images taken by the digital camera. Before the individual leaves, the individual can quickly share his/her pictures with his/her friends by merely removing the portable media device 100 from the digital camera and connecting it to another portable media device 100 via the synchronization device 200 to begin transferring pictures.

Although embodiments of the invention have been described with respect to synchronizing two portable media devices 100, it will be appreciated by those of skill in the art that the synchronization manager 206, 326 may be used to synchronize more than two portable media devices 100 simultaneously. Furthermore, although the diagrams shown in FIGS. 4 and 5 represent two-way copying of files, certain embodiments may allow for one-directional copying of files based on rules or policies used to instruct the synchronization manager 206, 326 when to perform only one-directional copying. More specifically, once the portable media devices 100 are plugged into the synchronization device 200, the synchronization manager 206, 326 can decide, based on these rules or policies, to copy files from one portable media device 100 to another, but not copy any files in the reverse direction.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer readable medium having computer executable instructions for performing steps comprising:
    establishing a direct connection between one of at least two portable media devices, the at least two portable media devices comprising at least two unpowered portable memory data storage devices, and a portable synchronization device;
    initiating a synchronization manager comprising predetermined instructions for synchronizing portable media devices; and
    determining, based on the instructions of the synchronization manager, and without requesting real-time user input, whether to copy a file on the one of the at least two portable media devices, such that the file is ultimately transferred directly from the portable synchronization device to another of the at least two portable media devices if the synchronization manager determines that the file should be transferred.

2. The computer readable medium of claim 1 wherein the synchronization manager is automatically initiated once the direct connection is established.

3. The computer readable medium of claim 1 wherein the synchronization manager is stored on the portable synchronization device.

4. The computer readable medium of claim 1 wherein the synchronization manager is stored on at least one of the portable media devices.

5. The computer readable medium of claim 1 further comprising traversing through a file allocation table to find the file on the one of the at least two portable media devices.

6. The computer readable medium of claim 1 further comprising analyzing file properties to determine whether to copy the file.

7. The computer readable medium of claim 6 wherein file properties are in a file allocation table.

8. The computer readable medium of claim 6 wherein the file properties are in metadata of the file.

9. The computer readable medium of claim 1 wherein the synchronization manager copies a chosen file type before other file types are copied.

10. The computer readable medium of claim 1 wherein the predetermined instructions are adjusted based on user input.

11. A method for synchronizing files between at least two portable media devices comprising the steps of:
    establishing a direct connection between one of the at least two portable media devices, the at least two portable media devices comprising at least two unpowered portable memory data storage devices, and a portable synchronization device;
    initiating a synchronization manager comprising predetermined instructions for synchronizing portable media devices; and
    determining, based on the instructions of the synchronization manager, and without requesting real-time user input, whether to copy a file on the one of the at least two portable media devices, such that the file is ultimately transferred directly from the portable synchronization device to another of the at least two portable media devices if the synchronization manager determines that the file should be transferred.

12. A portable media synchronization device comprising:
    a hardware interface for directly connecting at least one portable media device to the portable media synchronization device, the at least one portable media device comprising an unpowered portable memory data storage device;
    internal memory; and
    a synchronization manager comprising predetermined instructions for copying files from a first portable media device to a second portable media device, such that the synchronization manager is initiated after a direct connection is established via the hardware interface, and such that the synchronization manager copies a file from the first portable media device to the second portable media device based on the predetermined instructions.

13. The device of claim 12 wherein the synchronization manager is automatically initiated once the direct connection is established via the hardware interface.

14. The device of claim 12 wherein the device copies the file without requesting real-time user input.

15. The device of claim 12 wherein synchronization manager analyzes file properties to determine whether to copy the file.

16. The device of claim 12 wherein the synchronization manager traverses through a file allocation table to find the file on the first portable media device.

17. The device of claim 12 wherein the synchronization manager copies a chosen file type before other file types are copied.

18. The device of claim 12 further comprising an indicator for informing a user when the synchronization is complete.

19. The device of claim 12 wherein the synchronization manager copies a file from the second portable media device to the first portable media device based on the predetermined instructions.

20. The device of claim 12 wherein the instructions are changed by a user prior to the synchronization.

* * * * *